(12) United States Patent
Jiang

(10) Patent No.: US 12,077,957 B1
(45) Date of Patent: Sep. 3, 2024

(54) POSITIVE AND NEGATIVE PRESSURE RESISTANT SEALING APPARATUS OF BALANCE SHAFT TWO-WAY VALVE PLATE USED FOR DRAINAGE PIPELINE

(71) Applicant: Chengxu Jiang, Liaoning (CN)

(72) Inventor: Chengxu Jiang, Liaoning (CN)

( * ) Notice: Subject to any disclaimer, the term of this patent is extended or adjusted under 35 U.S.C. 154(b) by 0 days.

(21) Appl. No.: 18/658,884

(22) Filed: May 8, 2024

Related U.S. Application Data

(63) Continuation of application No. PCT/CN2023/098461, filed on Jun. 6, 2023.

(51) Int. Cl.
| | |
|---|---|
| *E03F 7/04* | (2006.01) |
| *E03C 1/28* | (2006.01) |
| *E03C 1/282* | (2006.01) |
| *E03F 5/042* | (2006.01) |

(52) U.S. Cl.
CPC ............ *E03F 7/04* (2013.01); *E03C 1/28* (2013.01); *E03C 1/282* (2013.01); *E03F 5/042* (2013.01)

(58) Field of Classification Search
CPC .... E03F 7/04; E03F 5/042; E03C 1/28; E03C 1/281
USPC ..... 137/516.25, 215, 217, 218, 247, 247.13, 137/530, 562, 637.1; 4/680, 682, 219
See application file for complete search history.

(56) References Cited

U.S. PATENT DOCUMENTS

| | | | | |
|---|---|---|---|---|
| 1,770,637 A | * | 7/1930 | Wagner | E03F 5/042 137/448 |
| 1,784,076 A | * | 12/1930 | Rocas | E03F 5/042 137/527.8 |
| 3,202,165 A | * | 8/1965 | Yavicoli | E03F 7/04 137/107 |
| 4,503,881 A | * | 3/1985 | Vecchio | E03F 7/04 137/448 |
| 8,459,298 B1 | * | 6/2013 | Valdez | E03F 7/06 137/315.16 |
| 9,377,125 B2 | * | 6/2016 | Lee | F16K 1/2007 |

(Continued)

*Primary Examiner* — Minh Q Le

(57) ABSTRACT

Disclosed is a positive and negative pressure resistant sealing apparatus of a balance shaft two-way valve plate used for a drainage pipeline, which relates to the technical field of sewer line water seal protection. The apparatus comprises: a main body, a pressure conductor and a balance shaft two-way powered valve plate; the main body comprises a pressure conduction cavity and a drainage cavity, the pressure conduction cavity is located on one side of the drainage cavity, and the pressure conductor is arranged in the pressure conduction cavity of the main body. In the present invention, the effects of a pressure conduction membrane, a transmission connecting rod and the pressure conductor make it so that when the pressure at an upper end of a water seal is greater than the pressure at the lower end, a pressure membrane abuts against and holds in place the pressure conductor, causing the pressure conductor to have a downward movement trend, and causing the pressure conductor to push the transmission connecting rod, further causing the transmission connecting rod to abuts against and hold in place a supporting rod, preventing the supporting rod from forming a rotating trend to push the balance shaft two-way powered valve plate, further preventing the balance shaft two-way powered valve plate from driving an opening and closing valve plate to open, and thereby effectively preventing odor from spreading in the sewer pipeline.

6 Claims, 5 Drawing Sheets

(56) References Cited

U.S. PATENT DOCUMENTS

| | | | | |
|---|---|---|---|---|
| 10,626,585 | B1* | 4/2020 | Sullivan | F16K 15/03 |
| 2007/0295404 | A1* | 12/2007 | Cover | E03C 1/108 |
| | | | | 137/218 |
| 2010/0243074 | A1* | 9/2010 | Eklund | E03C 1/298 |
| | | | | 137/247 |
| 2010/0243546 | A1* | 9/2010 | Giammaria | E03F 5/042 |
| | | | | 210/170.03 |
| 2015/0176261 | A1* | 6/2015 | McAlpine | F16K 15/063 |
| | | | | 137/12 |
| 2016/0201309 | A1* | 7/2016 | Kosarnig | E03C 1/298 |
| | | | | 137/854 |
| 2017/0051493 | A1* | 2/2017 | Xu | E03F 7/04 |
| 2019/0194921 | A1* | 6/2019 | Choi | E03F 5/041 |
| 2020/0173153 | A1* | 6/2020 | Hennes | E03D 13/007 |
| 2020/0263410 | A1* | 8/2020 | Coscarella | F16K 37/0041 |
| 2021/0047823 | A1* | 2/2021 | Coscarella | F16K 15/1821 |
| 2021/0270022 | A1* | 9/2021 | Dowling | E03C 1/232 |

\* cited by examiner

US 12,077,957 B1

POSITIVE AND NEGATIVE PRESSURE RESISTANT SEALING APPARATUS OF BALANCE SHAFT TWO-WAY VALVE PLATE USED FOR DRAINAGE PIPELINE

FIELD OF THE INVENTION

The present application relates to sewer line water seal protection. More specifically, the present application relates to a positive and negative pressure resistant sealing apparatus of balance shaft two-way valve plate used for drainage pipeline.

BACKGROUND

Sewer pipelines are essential for buildings to discharge sewage and they also play a crucial role in supporting public facilities in a city. To prevent sewage and toxic gases from overflowing in the pipelines, anti-odor devices are usually installed. These devices adopt a water-sealed structure that relies on water seals to isolate the used space from the sewer pipelines. This functional technology is highly effective in preventing unpleasant odors and harmful gases from spreading.

In a utility model patent called "Automatic Sealing Sewer Pipe Deodorizer" with publication number CN201809833U, a device has been designed that can be installed on any sewer pipe. This device has a deodorant flap body that is opened downward by the weight of the water flow when in use, allowing the water to flow normally. When not in use, the weight of the counterweight body causes the deodorizing flap body and the automatic deodorizing valve body to close. However, if there is a large negative pressure in the existing sewer pipeline, the air pressure at the upper end of the deodorizing flap body becomes greater than the air pressure at the lower end, which causes the anti-odor flap body to open. At this point, the water seal in the drainage device can be sucked away by the negative pressure of the sewer line, which destroys the protective function of the water seal. This can cause odor to overflow into the used space when the air pressure in the sewer line is greater than the air pressure of the use space. This is not desirable as it does not meet the increasing environmental quality requirements of modern urban buildings.

SUMMARY

The present invention overcomes the limitations of existing technology by providing a sealing device capable of withstanding both positive and negative pressure for a balance shaft two-way valve plate used in drainage pipelines. This device addresses the problem of existing sewer pipelines where large negative pressure can cause the anti-odor flap body at the upper end to open due to greater air pressure than the lower end, thus leading to suction of the water seal in the drainage device and destruction of its protective function. This can result in unpleasant odors overflowing into the use space. Additionally, there are instances where the air pressure in the sewer line exceeds the air pressure of the use space, which can also cause the odor to overflow.

To achieve the above objectives, the present invention is implemented through the following technical solutions: a positive and negative pressure resistant sealing apparatus of balance shaft two-way valve plate used for drainage pipeline, comprising a main body, a pressure conductor and a balance shaft two-way power valve plate; the main body comprising a pressure conduction chamber and a drainage cavity; the pressure conduction chamber is located on the side of the drainage cavity; the pressure conductor is arranged in the pressure conduction cavity of the main body; the upper end of the pressure conduction chamber has an inclined slope structure; wherein at the upper end of the pressure conduction chamber, there is an orifice; the upper end face of the orifice is provided with a pressure conducting membrane; the lower end of the pressure conducting membrane is in contact with the upper wall surface of the pressure conductor; wherein a transmission connecting rod is fixedly installed at the lower end of the pressure conductor; wherein a limited bottom cover is fixedly installed on the lower wall of the pressure conduction chamber; wherein the transmission connecting rod runs through the limited bottom cover; the lower end of the transmission connecting rod has an arc surface structure; wherein a pair of balance stand are fixedly installed on the lower wall of the limited bottom cover; the balance shaft two-way power valve plate is rotatably connected between a pair of the balance stand; wherein a support rod is fixedly installed on the upper wall of the left end of the balance shaft two-way power valve plate; the upper end of the support rod has an arc surface structure; the lower end of the transmission connecting rod is in contact with the upper end of the support rod; the right end of the balance shaft two-way power valve plate is fixedly installed with an open-close valve plate; the open-close valve plate is in contact with the lower end port of the drainage cavity; wherein a core holder is fixedly installed between a pair of balance stand and above the balance shaft two-way power valve plate; wherein the magnetic core holder and the balance shaft two-way power valve plate are provided with a magnetic core power source.

Wherein the empty part of the pressure conduction cavity formed on one side of the main body cavity is the drainage cavity.

Wherein the magnetic core power source includes a first fixed magnetic core, a second fixed magnetic core, a first moving magnetic core and a second moving magnetic core. The first fixed magnetic core and the second fixed magnetic core are fixedly installed on the magnetic core holder from left to right. The first moving magnetic core and the second moving magnetic core are fixedly installed on the balance shaft two-way power valve plate from left to right.

Wherein the pressure conductor, the pressure conducting membrane and the limited cover are parallel to each other.

Wherein a limit plate is fixedly installed on the lower wall of the pressure conductor and on one side of the transmission connecting rod; wherein the limit plate is located in the pressure conduction chamber.

Wherein the balance shaft two-way power valve plate has rotating shafts fixedly installed on the front and rear walls respectively; wherein the balance shaft two-way power valve plate is rotatably connected between a pair of balance stands through a shaft.

Wherein an air pressure conduction hole located on the lower wall of the limited bottom cover and on one side of the transmission connecting rod.

Wherein the lower end port of the drainage cavity is fixedly installed with a sealing ring.

BENEFICIAL EFFECTS OF THE INVENTION

This invention provides a sealing device for a balance shaft two-way valve plate used in drainage pipelines that is capable of withstanding both positive and negative pressure. The device solves a common issue found in existing sewer pipelines, where a large negative pressure can cause a difference in air pressure between the upper and lower ends of the anti-odor flap body. This difference in pressure can cause the water seal in the drainage device to be sucked away, destroying its protective function. When the pressure in the sewer line is greater than the pressure in the use space, the odor can overflow.

To solve this issue, the present invention utilizes a pressure conduction film, a transmission connecting rod, and a pressure conductor. When the pressure at the upper end of the water seal is greater than the pressure at the lower end, the pressure film withstands the pressure conductor, causing the pressure conductor to push the transmission connecting rod. This action causes the transmission connecting rod to resist the support rod, preventing the support rod from forming a rotation tendency. As a result, the balance shaft two-way power valve plate is not driven to open the start-up valve plate and the closing valve plate, thereby effectively preventing the odor in the sewer pipe from dispersing.

Figure 1:
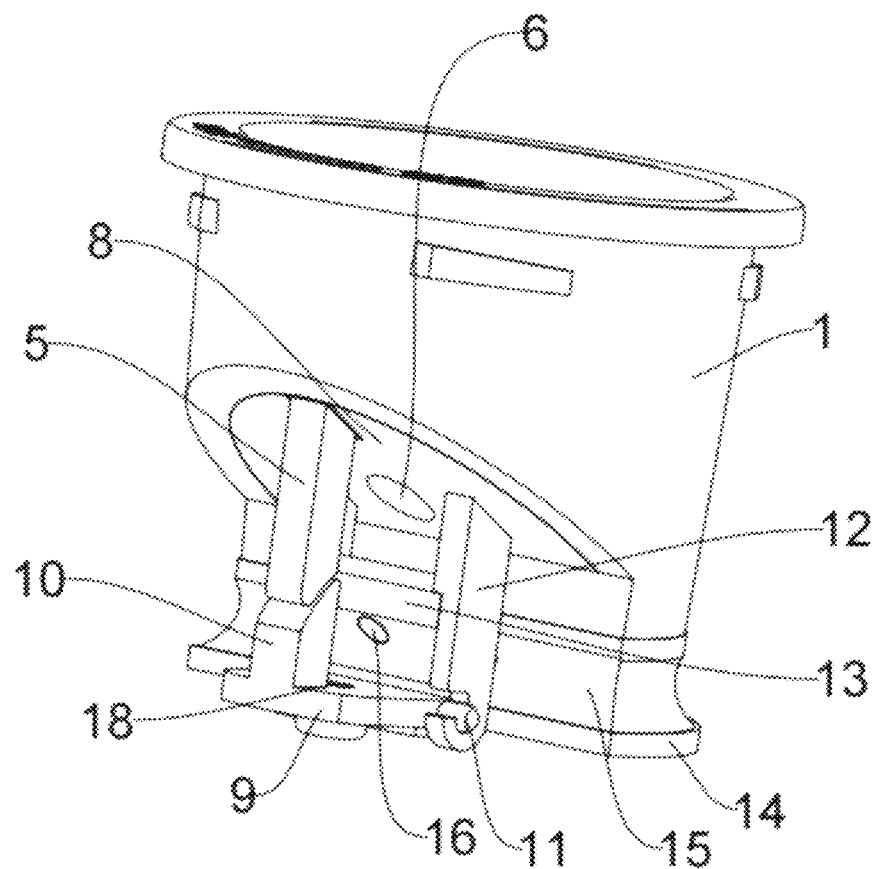
FIG. 1 is a perspective view of a positive and negative pressure resistant sealing apparatus of balance shaft two-way valve plate used for drainage pipeline.
Figure 2:
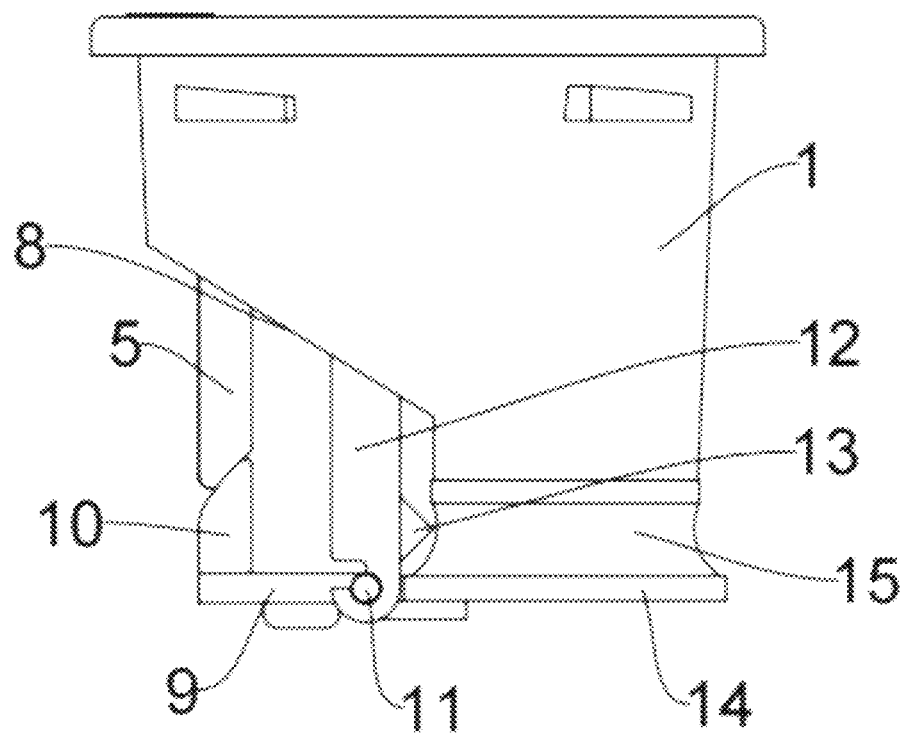
FIG. 2 is a front view of a positive and negative pressure resistant sealing apparatus of balance shaft two-way valve plate used for drainage pipeline.
Figure 3:
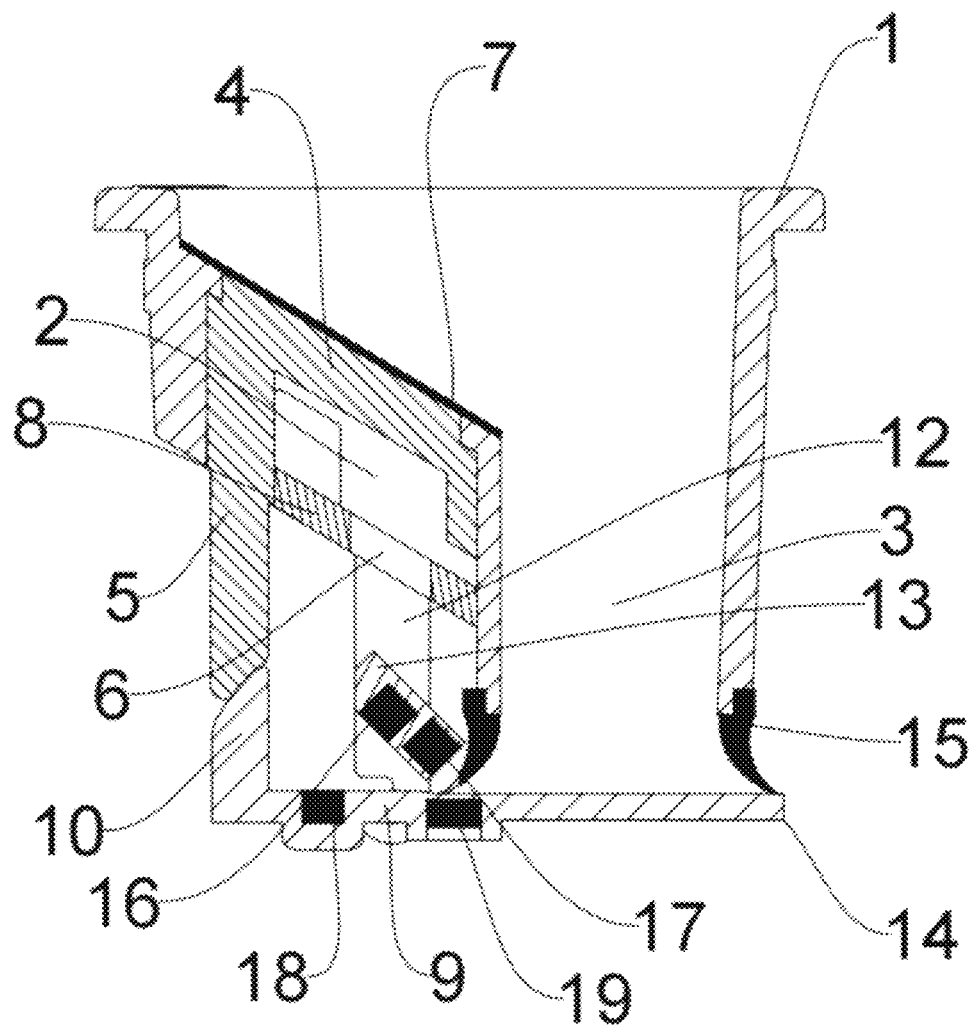
FIG. 3 is a sectional view of a positive and negative pressure resistant sealing apparatus of balance shaft two-way valve plate used for drainage pipeline.
Figure 4:
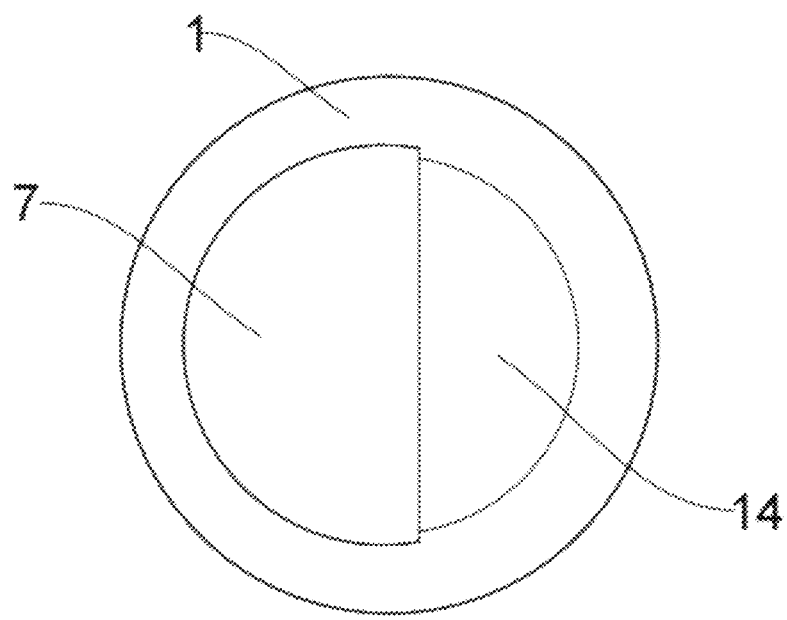
FIG. 4 is a top plan view of a positive and negative pressure resistant sealing apparatus of balance shaft two-way valve plate used for drainage pipeline.
Figure 5:
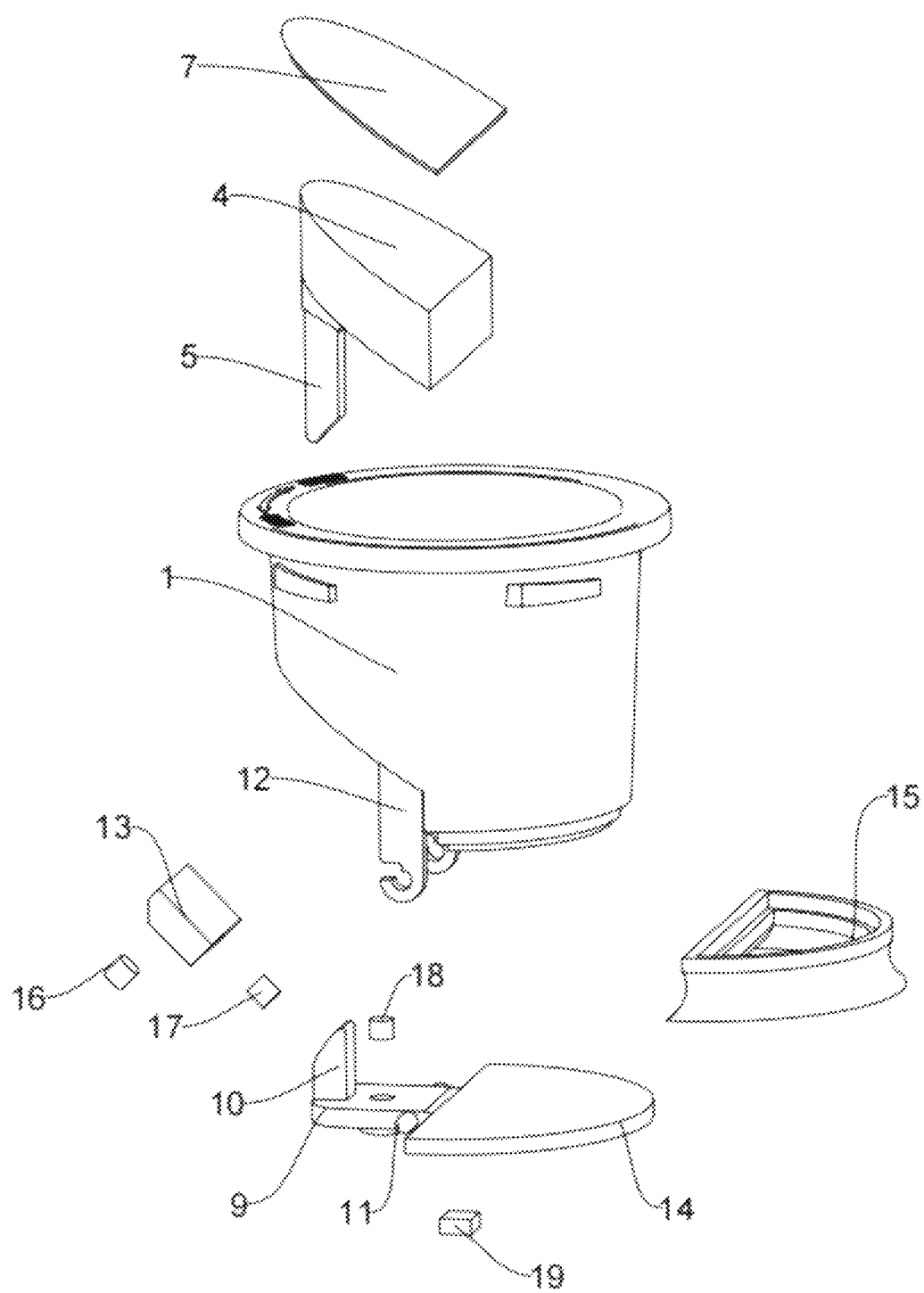
FIG. 5 is an exploded view of a positive and negative pressure resistant sealing apparatus of balance shaft two-way valve plate used for drainage pipeline.

As show in FIGS. 1-5:
1. main body; 2. pressure conduction chamber; 3. Drainage cavity; 4. pressure conductor; 5. transmission connecting rod; 6. air pressure conduction hole; 7. pressure conducting membrane; 8. limited bottom cover; 9. balance shaft two-way power valve plate; 10. support rod; 11. shaft; 12. balance stand; 13. magnetic core holder; 14. open-close valve plate; 15. sealing ring; 16. first fixed magnetic core; 17. second fixed magnetic core; 18. first moving magnetic core; 19. second moving magnetic core

DETAILED DESCRIPTION OF EMBODIMENTS

While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

A positive and negative pressure resistant sealing apparatus of balance shaft two-way valve plate used for drainage pipeline, comprising a main body, a pressure conductor and a balance shaft two-way power valve plate; the main body comprising a pressure conduction chamber and a drainage cavity; the pressure conduction chamber is located on the side of the drainage cavity; the pressure conductor is arranged in the pressure conduction cavity of the main body; the upper end of the pressure conduction chamber 2 has an inclined slope structure; wherein at the upper end of the pressure conduction chamber 2, there is an orifice; the upper end face of the orifice is provided with a pressure conducting membrane 7; the lower end of the pressure conducting membrane 7 is in contact with the upper wall surface of the pressure conductor 4; wherein a transmission connecting rod 5 is fixedly installed at the lower end of the pressure conductor 4; wherein a limited bottom cover 8 is fixedly installed on the lower wall of the pressure conduction chamber 2; wherein the transmission connecting rod 5 runs through the limited bottom cover 8; the lower end of the transmission connecting rod 5 has an arc surface structure; wherein a pair of balance stand 12 are fixedly installed on the lower wall of the limited bottom cover 8; the balance shaft two-way power valve plate 9 is rotatably connected between a pair of the balance stand 12; wherein a support rod 10 is fixedly installed on the upper wall of the left end of the balance shaft two-way power valve plate 9; the upper end of the support rod 10 has an arc surface structure; the lower end of the transmission connecting rod 5 is in contact with the upper end of the support rod 10; the right end of the balance shaft two-way power valve plate 9 is fixedly installed with an open-close valve plate 14; the open-close valve plate 14 is in contact with the lower end port of the drainage cavity 3; wherein a core holder 13 is fixedly installed between a pair of balance stand 12 and above the balance shaft two-way power valve plate 9; wherein the magnetic core holder 13 and the balance shaft two-way power valve plate 9 are provided with a magnetic core power source. The magnetic core power source includes a first fixed magnetic core 16, a second fixed magnetic core 17, a first moving magnetic core 18 and a second moving magnetic core 19. The first fixed magnetic core 16 and the second fixed magnetic core 17 are fixedly installed on the magnetic core holder 13 from left to right. The first moving magnetic core 18 and the second moving magnetic core 19 are fixedly installed on the balance shaft two-way power valve plate 9 from left to right. Wherein the pressure conductor 4, the pressure conducting membrane 7 and the limited cover 8 are parallel to each other. Wherein a limit plate is fixedly installed on the lower wall of the pressure conductor 4 and on one side of the transmission connecting rod 5; wherein the limit plate is located in the pressure conduction chamber 2. Wherein the balance shaft two-way power valve plate 9 has rotating shafts 11 fixedly installed on the front and rear walls respectively; wherein the balance shaft two-way power valve plate 9 is rotatably connected between a pair of balance stands 12 through a shaft 11. Wherein an air pressure conduction hole 6 located on the lower wall of the limited bottom cover 8 and on one side of the transmission connecting rod 5. Wherein the lower end port of the drainage cavity 3 is fixedly installed with a sealing ring 15.

The detailed connection means are well-known technologies in this field. The following mainly introduces the working principle and process, and the specific work.

In an embodiment, according to the accompanying drawings, when negative pressure occurs in the sewer line, there is a pressure difference between the upper and lower ends of the pressure conducting membrane 7 (the pressure conducting membrane 7 is made of high-elastic rubber material). The pressure at the upper end of the pressure conducting membrane 7 is greater than the pressure at the lower end. The pressure generated by the pressure difference acts on the pressure conductor 4. The pressure conductor 4 generates downward pressure, causing the lower end of the transmission connecting rod 5 to act on the upper end of the support rod 10 of the balance shaft 11 two-way power valve plate 9. The arc surface at the lower end of the transmission connecting rod 5 is in contact with the arc surface at the upper end of the support rod 10. The shaft 11 of the balance shaft two-way power valve plate 9 generates a resistance torque that prevents the open-close valve plate 14 from opening. When the open-close valve plate 14 of the balance shaft two-way power valve plate 9 responds to the negative pressure of the sewer line, a pressure difference is created between the upper and lower ends. The pressure at the upper end is higher than the one at the lower end, which results in downward pressure. There is also the torque to open the open-close valve plate 14. When the closing torque of the open-close valve plate 14 is greater than or equal to its opening torque, the balance shaft two-way power valve plate remains closed. The open-close valve plate 14 presses tightly against the sealing ring 16 of the main body 1. The second moving magnetic core 19 is attracted by the second fixed magnetic core 17 to prevent the passage of negative pressure. The purpose of the balance shaft two-way power valve plate 9 is to prevent water seal damage that can occur due to negative pressure in the sewer pipeline. When there is positive pressure or a sewage overflow, the lower end of the open-close valve plate 14 of the balance shaft two-way power valve plate 9 remains closed due to the pressure. When draining water, the pressure of the water acting on the pressure conducting membrane 7 is lower than the pressure of the water on the open-close valve plate 14. As a result, the torque that is generated to prevent the open-close valve plate 14 from opening is less. Balance shaft two-way power valve plate opens for drainage. When water drainage stops, the balance shaft two-way power valve plate 9 attracts the second fixed magnetic core 17 and the second moving magnetic core 19. The torque that closes the open-close valve plate 14 is generated by the repulsion between the first fixed magnetic core and the first moving magnetic core. The open-close valve plate 14 is closed, blocking the water seal and using space in the sewer pipeline.

While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

The invention claimed is:

1. A positive and negative pressure resistant sealing apparatus of balance shaft two-way valve plate used for drainage pipeline, comprising a main body, a pressure conductor and a balance shaft two-way power valve plate; the main body comprising a pressure conduction chamber and a drainage cavity; the pressure conduction chamber is located on the side of the drainage cavity; the pressure conductor is arranged in the pressure conduction cavity of the main body; the upper end of the pressure conduction chamber has an inclined slope structure; wherein at the upper end of the pressure conduction chamber, there is an orifice; the upper end face of the orifice is provided with a pressure conducting membrane; the lower end of the pressure conducting membrane is in contact with the upper wall surface of the pressure conductor; wherein a transmission connecting rod is fixedly installed at the lower end of the pressure conductor; wherein a limited bottom cover is fixedly installed on the lower wall of the pressure conduction chamber; wherein the transmission connecting rod runs through the limited bottom cover; the lower end of the transmission connecting rod has an arc surface structure; wherein a pair of balance stand are fixedly installed on the lower wall of the limited bottom cover; the balance shaft two-way power valve plate is rotatably connected between a pair of the balance stand; wherein a support rod is fixedly installed on the upper wall of the left end of the balance shaft two-way power valve plate; the upper end of the support rod has an arc surface structure; the lower end of the transmission connecting rod is in contact with the upper end of the support rod; the right end of the balance shaft two-way power valve plate is fixedly installed with an open-close valve plate; the open-close valve plate is in contact with the lower end port of the drainage cavity; wherein a magnetic core holder is fixedly installed between a pair of balance stand and above the balance shaft two-way power valve plate; wherein the magnetic core holder and the balance shaft two-way power valve plate are provided with a magnetic core power source.

2. The positive and negative pressure resistant sealing apparatus of balance shaft two-way valve plate used for drainage pipeline of claim 1, comprising the pressure conductor, the pressure conducting membrane and the limited cover are parallel to each other.

3. The positive and negative pressure resistant sealing apparatus of balance shaft two-way valve plate used for drainage pipeline of claim 1, wherein the limit bottom cover is fixedly installed on the lower wall of the pressure conductor and on one side of the transmission connecting rod; wherein the limit bottom cover is located in the pressure conduction chamber.

4. The positive and negative pressure resistant sealing apparatus of balance shaft two-way valve plate used for drainage pipeline of claim 1, wherein the balance shaft two-way power valve plate has rotating shafts fixedly installed on the front and rear walls respectively; wherein the balance shaft two-way power valve plate is rotatably connected between the pair of balance stands through the rotating shafts.

5. The positive and negative pressure resistant sealing apparatus of balance shaft two-way valve plate used for drainage pipeline of claim 1, comprising an air pressure conduction hole located on the lower wall of the limited bottom cover and on one side of the transmission connecting rod.

6. The positive and negative pressure resistant sealing apparatus of balance shaft two-way valve plate used for drainage pipeline of claim 1, comprising a lower end port of the drainage cavity is fixedly installed with a sealing ring.

\* \* \* \* \*